United States Patent [19]
Eichenbrenner et al.

[11] 3,795,134
[45] Mar. 5, 1974

[54] ANTI-BUCKLING FATIGUE TEST ASSEMBLY

[75] Inventors: Fred E. Eichenbrenner, Hampton; Leland A. Imig, Newport News, both of Va.

[73] Assignee: The United States of America as represented by the Administrator of the National Aeronautics and Space Administration, Washington, D.C.

[22] Filed: Mar. 30, 1972

[21] Appl. No.: 239,575

[52] U.S. Cl. .................................. 73/15.6, 73/91
[51] Int. Cl. ............................................ G01n 3/18
[58] Field of Search ................ 73/91, 94, 15.6, 103

[56] References Cited
UNITED STATES PATENTS
3,559,473  2/1971  Dudderar et al. .................... 73/94 X
FOREIGN PATENTS OR APPLICATIONS
142,455  7/1960  U.S.S.R. .............................. 73/15.6

*Primary Examiner*—Jerry W. Myracle
*Attorney, Agent, or Firm*—Howard J. Osborn; Wallace J. Nelson; John R. Manning

[57] ABSTRACT

An anti-buckling fatigue test assembly is disclosed for holding a metal specimen which is subjected to compression and to rapid cyclical heating and cooling while permitting visual observation. In an illustrative embodiment of this invention, the anti-buckling fatigue test apparatus includes first and second guide members between which the metal specimen is disposed and fixedly held, a heating assembly comprising a suitable heating source such as a quartz lamp and a reflecting assembly directing the heat onto the specimen, and a cooling assembly for directing a suitable cooling fluid such as air onto the specimen. Further, the guide members each have a passage to permit the heat to be directed therethrough onto the specimen. Significantly, an opening is provided in the reflecting assembly to permit visual inspection of that region of the specimen adjacent to the opening onto which the heat is directed. It is understood that suitable optical or photographic devices may record the effects upon the tested portion of the specimen resulting from the successive heating and cooling. In an illustrative embodiment of this invention, more than one heating assembly and cooling assembly are disposed upon the guide members so that simultaneous tests are performed at two different test locations of the specimen.

8 Claims, 2 Drawing Figures

ANTI-BUCKLING FATIGUE TEST ASSEMBLY

ORIGIN OF THE INVENTION

The invention described herein was made by employees of the United states Government and may be manufactured and used by or for the Government for governmental purposes without payment of any royalties thereon or therefor.

BACKGROUND OF THE INVENTION

1. Field of the Invention:

This invention relates to anti-buckling fatigue test devices and in particular to test apparatus for cyclically heating and cooling a portion of a specimen while permitting observation of the tested portion of the specimen.

2. Description of the Prior Art:

In fatigue test devices of the prior art, of which this invention is an improvement, a metal specimen is rigidly supported between opposed guide members. Particularly, it is desired to place a test specimen under various conditons and to observe the specimen to detect changes in its structure. Compressive forces may be applied to the specimen while the guide members serve to prevent the specimen from buckling. Further, suitable means may be provided for alternately cooling and heating the specimen. The test devices of the prior art have been so constructed as to provide only certain of these features. Typically, it may be necessary to examine the specimen while being subjected to these various conditions, e.g., heating, cooling or loading. The specimen could only be observed in the prior art systems by disassembling the test apparatus and permitting the operator to remove the specimen. However, it is desired to continue the testing while permitting visual observation of the tested portion of the specimen.

SUMMARY OF THE INVENTION

It is therefore an object of this invention to provide a new and improved fatigue test assembly for subjecting test specimens to multiple test conditions while simultaneously permitting visual or optical observation of the tested portion(s) of the specimen.

It is a further object of this invention to provide a new and improved fatigue test assembly for permitting simultaneously the compression and the cyclic heating and cooling of a test specimen while permitting the visual or optical observation of the tested portion of the specimen.

It is a still further object of this invention to provide a new and improved fatigue test apparatus for permitting the simultaneous testing of at least two portions of the specimen.

These and other objects are achieved in accordance with the teachings of this invention by providing a fatigue test apparatus comprising first and second guide members for receiving a test specimen therebetween, a heating assembly associated with at least one of the guide members for directing heat through an opening therein onto a test portion of the specimen, a cooling assembly for directing a suitable cooling fluid onto the test portion of the specimen, and means for defining an opening to permit visual and optical observation of that tested portion of the specimen.

In an illustrative embodiment of this invention, the heating assembly may include a reflecting assembly and at least one quartz lamp whose thermal energy is directed by the reflecting assembly through an opening within a guide member onto a portion of the test specimen. Further, the cooling assembly includes a suitable manifold associated with the guide member for directing the cooling fluid from a compressed source thereof through conduits within the guide member into contact with the test portion of the specimen. To facilitate observation of the test specimen, suitable openings are provided in the reflecting assembly and a transparent window disposed within a guide member to confine the air currents adjacent to the tested portion of the specimen while permitting visual observation of the specimen through the window.

In a further aspect of this invention, a second test location may be provided by the guide members for permitting another portion of the test specimen to be cyclically cooled and heated.

BRIEF DESCRIPTION OF THE DRAWINGS

These and other objects and advantages of the present invention will become more apparent by referring to the following detailed description and the accompanying drawings, of which.

DETAILED DESCRIPTION OF THE PREFERRED EMBODIMENT

Figure 1:
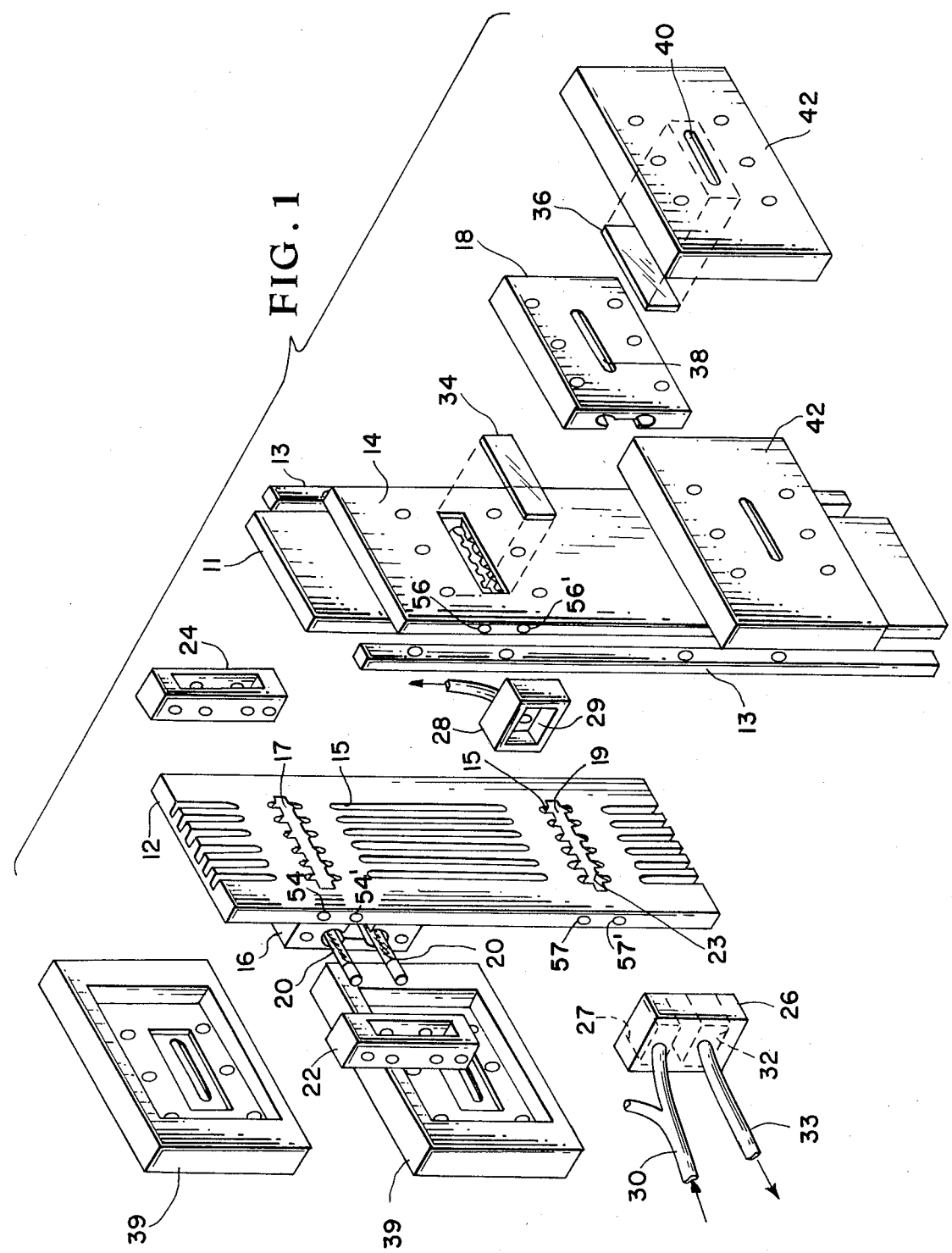
FIG. 1 is an exploded view of the fatigue test apparatus of this invention with parts omitted.

With regard to the drawings and in particular to FIG. 1, there is shown a fatigue test assembly 10 in accordance with the teachings of this invention, comprising first and second guide members 12 and 14 for receiving therebetween a metallic specimen 11 to be tested under various conditions. In particular, the specimen 11 is disposed lengthwise between opposing guide members 12 and 14; further, a shim 13 is disposed on either side of the test specimen 11 and has openings therein aligned with corresponding openings of the guide members 12 and 14 for receiving suitable fasteners such as bolts (not shown) for fastening the test assembly 10 together. As indicated in both FIGS. 1 and 2, the specimen 11 extends from either end of the test assembly 10 to permit the specimen 11 to be loaded axially in compression and in tension. Thus, the first and second guide members 12 and 14 serve to rigidly hold the specimen 11 therebetween, thus preventing buckling of the specimen when axial compressive loads are applied.

Figure 2:
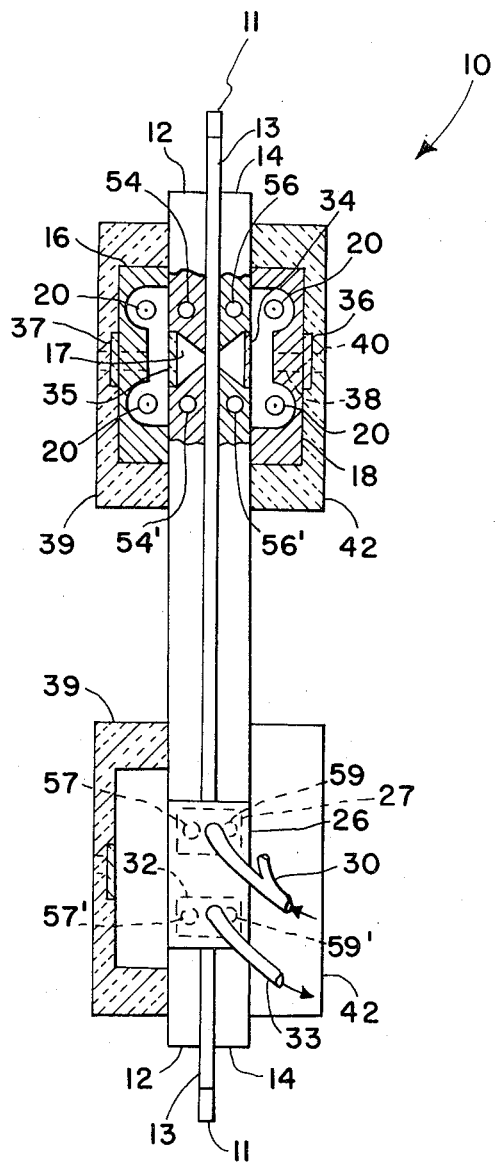
FIG. 2 is a partially sectioned, side view of the fatigue test apparatus of FIG. 1 showing how this apparatus is assembled with the test specimen disposed therebetween.

It is a significant aspect of this invention to permit the rapid heating and cooling of at least first and second portions of the specimen 11. As shown in FIG. 1, the first and second guide members 12 and 14 have openings therethrough to form first and second test locations 17 and 19 whereat the corresponding portions of the specimen 11 may be rapidly heated and cooled under visual or optical observation. In particular, a reflecting assembly 16 is secured to the first guide member 12, while a complementary reflecting assembly 18 is connected to the second guide member 14, to direct heat onto that portion of the specimen 11 disposed at the first test location 17. Though not shown, it may be understood that a corresponding pair of reflecting assemblies are secured to the first and second guide members 12 and 14 to direct heat onto that portion of the specimen 11 disposed at the second test location 19. As shown in FIGS. 1 and 2, a pair of suitable heat sources such as quartz lamps 20 are disposed within the reflecting assembly 16 and are supported therein by a pair of lamp mounting assemblies 22 and 24, which are secured to opposite sides of the reflecting assembly 16 as by suitable screws. Electrical connection is made to each end of the quartz lamps 20 through openings within the assemblies 22 and 24. Insulated wires are provided with a suitable female socket connected thereto, to be connected to each end of the quartz lamps 20 in a conventional manner. As indicated in FIGS. 1 and 2, a shield member 39 is disposed about the reflecting assembly 16, whereas a corresponding shield member 42 is disposed about the reflecting assembly 18. The shield members 39 and 42 may be made of a suitable insulating material such as a ceramic, and serve to protect the operator from the electric power used to energize the quartz lamps 20 and also to shield the operator from the heat generated by the quartz lamps 20.

As more clearly shown in FIG. 1, each of the reflecting assemblies 16 and 18 has an opening therethrough (the opening within the assembly 18 is identified by the numeral 38). Further, the shield members 39 and 42 likewise have openings (the opening within the shield member 42 is identified by the numeral 40) which are aligned with the openings within the corresponding reflecting assembly 16 and 18 to permit visual or optical observation of that portion of the specimen 11 disposed at the first test location 17. In order to prevent the heat generated by the quartz lamps 20 or the air circulated in a manner to be explained, from escaping the first test location, a first transparent member 34 is disposed within a recess of the guide member 14, and a second transparent member 36 is disposed within a recess of the shield member 42. The transparent members 34 and 36 are transmissive to radiation and are also made of a suitable heat resisting material. Further, the transparent members 34 and 36 are aligned with the openings 38 and 40 to permit visual or optical observation of that portion of the specimen 11 disposed at the first test location 17. Similar transparent members 35 and 37 are disposed in like manner with respect to the guide member 12, the reflecting assembly 16 and the shield member 39.

It is a significant aspect of this invention that portions of the specimen 11 may be subjected to cylically varying temperature conditions. In order to cool these portions of the specimen 11, suitable means are provided for directing a suitable cooling fluid such as air into those openings defining the first and second test location 17 and 19. With regard to FIG. 1, an entrance fluid conduit 30 is provided for directing the cooling fluid from a compressed source (not shown) to a pair of manifolds secured to the guide member 12. For the sake of clarity, only a single manifold identified by the numeral 26 is shown secured to the lower portion of the member 12 in association with the second test location 19. It is understood that a similar manifold may also be associated with the first test location 17. The entrance fluid conduit 30 is shaped in the form of a "Wye" and insures that the fluid coolant is supplied equally to each manifold. Thus, the cooling fluid is introduced into manifold 26 via conduit 30 with common passageway 27 formed in manifold 26 permitting fluid flow into each of passages 57 and 59. Passage 57, for example, leads into the opening defined by guide member 12, a transparent member 34 and a portion of specimen 11, all of which combine to define one side of test area 19. The cooling fluid exits from test area 19 via cooling fluid exit passage 57' opening into a common passageway 32 in manifold 26 and exit conduit 33. Additionally, some of the cooling fluid exits through exit manifold 28 via passageway 29 common to both guides 12 and 14 and communicating with openings therein leading into test area 19. It may be understood that a similar exit manifold is associated with the first test location 17. Thus, the portions of the specimen associated with the first and second test location 17 and 19 may be rapidly heated and cooled under optical or visual observation. In an illustrative embodiment of this invention, a test specimen was heated from room temperature to approximately 600°F and then cooled back to room temperature in approximately 1 minute.

With regard to FIG. 2, first and second pairs of passages 54, 57 and 54',57' are disposed within the first guide member 12 in communication with the openings defining the first and second test locations 17 and 19. Also, pairs of passages 56,56' and 59,59' are disposed in guide member 14 and lead to the other half of the test locations 17 and 19 in a like manner. Passages 56,56' and 59,59' are also disposed in communication with the respective manifolds.

The guide member 12 as shown in FIG. 1 has a plurality of fingers 23 extending toward each other, with a plurality of slots 15 disposed therebetween to facilitate the circulation of the cooling fluid onto the test specimen 11. Further, the fingers 23 serve to provide additional support for the specimen 11 as it is placed under compressive loads. The cooling fluid may be directed onto both sides of the specimen as described hereinbefore through appropriate conduits and manifolds associated with guide members 12 and 14 at each of the first and second test locations 17 and 19. More specifically, two additional pairs of passages 56,56' and 59,59' are provided in a guide member 14 and are associated with the same manifolds as for guide member 12 for directing the cooling fluid to the other side of the test specimen 11. Though the cooling fluid has been described as compressed air, cooling at different rates may be achieved by using other suitable cooling fluids.

In operation, the specimen 11 is inserted between the guide members 12 and 14, and bolts are inserted through the openings within the guide members and the shims 13 to thereby securely fasten the guide members 12 and 14 together. Next, the specimen 11 is subjected to loads in tension and in compression while those portions of the specimen 11 disposed at the first and second test location are cyclically heated and cooled. Further, access is provided to visually or optically observe the specimen at the test locations 17 and 19. Further, it may be desirable to photograph these portions of the specimen 11 as they are being tested. At some point during the test of each specimen 11, a fatigue crack in the specimen will cause the specimen to break. The fatigue crack will normally occur at only one portion of the test specimen; it may be desired to continue the testing of the remaining parts of the specimen 11. In such case, one of the guide members may be removed and the cracked portion of the specimen 11 secured together by suitable lap splices which may be bolted to both sides of the test specimen 11. With the specimen so spliced, a pair of abbreviated guide members (not shown), resembling the guide members 12 and 14 but only half as long, is secured to the lap splice members to cover that portion of the specimen 11 which was not cracked. Thus, the testing may be continued with the uncracked portion being subjected to cyclical heating and cooling under compressive and/or tension loads.

Numerous changes may be made in the above described apparatus and different embodiments of the invention may be made without departing from the spirit thereof. For example, such assemblies may be designed to accommodate specimens with more than two test sections and of differing shapes. Therefore, it is intended that all matter contained in the foregoing description and accompanying drawings shall be interpreted as illustrative and not in a limiting sense.

What is claimed is:

1. Apparatus for holding a specimen for test compression and/or tension load testing while the specimen is subjected to varying temperature conditions, said apparatus comprising:
   a. first and second guide members for receiving a specimen therebetween and for preventing the specimen from buckling during testing, at least one of said first and second guide members defining a test location whereat the test portion of the specimen is subjected to varying temperature conditions;
   b. means for directing thermal energy only onto the test portion of the specimen;
   c. means for directing a cooling fluid onto the test portion of a specimen; and
   d. means for facilitating visual observation of the test portion during a test.

2. Apparatus as claimed in claim 1, wherein the first and second guide members also define means forming a second test location and means adjacent thereto for directing thermal energy only onto a second test portion of the specimen.

3. Apparatus as claimed in claim 1, wherein said means of thermal energy comprises a heat radiating element and an assembly for reflecting the generated thermal energy onto the test portion of the specimen.

4. Apparatus as claimed in claim 1, wherein said means for directing cooling fluid includes passages within the first and second guide members in communication with said test location, and at least one manifold assembly for receiving the cooling fluid and providing for exchange thereof with said passage.

5. Apparatus as claimed in claim 4, wherein said reflecting assembly defines an opening therein aligned with said test portion for visual observation thereof and a transparent member covering said opening for preventing loss of the cooling fluid.

6. An anti-buckling fatigue test apparatus for holding a specimen for testing compression and/or tension loading while the specimen is subjected to varying temperature conditions, said apparatus comprising:
   a. first and second guide members for receiving the specimen therebetween, said first and second guide members releasably fastened together for preventing the specimen from buckling during testing, each of said first and second guide members having at least first and second openings therein for defining when secured together corresponding first and second test locations whereat corresponding first and second test portions are subjected to varying temperature conditions, each of said first and second guide members having first and second pairs of passages in communication with said first and second test locations, respectively;
   b. conduit means for directing a cooling fluid to said test jig apparatus and being disposed in communication with at least one passage of each of said pairs;
   c. heating means associated with said first and second openings of at least one of said first and second guide members and comprising an electrically actuated heating element and an assembly enclosing said opening and providing a reflective surface for directing the heat therefrom through said opening onto the corresponding test portion of the specimen; and
   d. window means for permitting observation of the first and second test locations, comprising an opening within said reflective assembly aligned with said corresponding opening of said guide member and a transparent member disposed to seal said opening.

7. Apparatus as in claim 6, wherein said conduit includes an entrance manifold and exit manifold each disposed in communication with one of said conduits for permitting the entrance and exit of the cooling fluid respectively from said associated opening.

8. Apparatus as in claim 6, wherein there is further included at least one heat shield member for being disposed about said reflecting assembly to shield an operator from the generated heat and electrical shock.

* * * * *